United States Patent [19]

Tyler

[11] Patent Number: 4,796,737
[45] Date of Patent: Jan. 10, 1989

[54] CLUTCH AND LOCK MECHANISM
[75] Inventor: D. Kevin Tyler, Hebron, Ky.
[73] Assignee: Litton Industrial Automation Systems, Inc., Hebron, Ky.
[21] Appl. No.: 25,639
[22] Filed: Mar. 13, 1987
[51] Int. Cl.[4] .............................................. F16D 67/02
[52] U.S. Cl. .................................. 192/18 R; 192/67 P
[58] Field of Search ...................... 192/12 R, 15, 18 R, 192/18 A, 67 P

[56] References Cited

U.S. PATENT DOCUMENTS

| 857,207 | 6/1907 | Schauer | 192/18 R |
| 1,117,910 | 11/1914 | Riley | 192/18 R |
| 2,180,287 | 11/1939 | Zwack | 192/18 B |
| 2,787,355 | 4/1957 | Dodge | 192/18 R X |
| 3,400,791 | 9/1968 | Garrison et al. | 192/12 R |
| 4,553,652 | 11/1985 | Fallos | 192/18 R |

FOREIGN PATENT DOCUMENTS 360513 12/1919 Fed. Rep. of Germany .... 192/67 P

Primary Examiner—Leslie A. Braun
Assistant Examiner—Richard M. Lorence
Attorney, Agent, or Firm—Herbert A. Stern

[57] ABSTRACT

A clutch and lock mechanism adapted for use with a double shuttle table utilizing two individual drive shafts wherein a first shaft ring assembly is fixedly coupled to a first shaft and a second shaft ring assembly is coupled to the second shaft. The first and second shafts and shaft ring assemblies are spaced fom one another along the common axis of rotation of the first and second shafts and an engaging mechanism is positioned between the two shaft ring assemblies and movable therebetween. When the engaging mechanism, at least a portion of which is rotationally locked to the second shaft, is moved to a first position, it is rotationally locked to the first shaft and rotation of the first shaft thereby results in the rotation of the second shaft. When the engaging mechanism is moved to a second position, opposed to the first position, it is disengaged from the first shaft and prevents the rotation of the second shaft.

9 Claims, 4 Drawing Sheets

CLUTCH AND LOCK MECHANISM

BACKGROUND OF THE INVENTION

This invention relates to a clutch and lock mechanism, and more particularly to such a mechanism adapted for use with a double shuttle table.

Shuttle tables are frequently used in automated storage and retrieval facilities such as warehouses, where they may be carried by cranes or similar devices. Double, or double-wide, shuttle tables known in the art are frequently utilized when it is necessary to store and retrieve loads which exceed the capacity of a single shuttle table. The use of such double-wide shuttle tables or, alternatively, a pair of single shuttle tables permanently coupled, is inefficient when the load to be transported is of insufficient size or weight to justify the use of a double table. Currently known mechanisms which attempt to overcome such inefficiencies by permitting the coupling and uncoupling of two individual tables so that only a single table is utilized when such is all that is required, suffer from the deficiency that the second, unused, table frequently moves when it is uncoupled from the first, load-carrying, table. This, in turn, can cause numerous problems. For example, the drive mechanisms for the two tables may not remain in synchronization when the unused table moves due to, for example, vibrations induced by the motion of the table being utilized. Another drawback occurs when such tables are carried by, for example, the aforementioned cranes which move in the narrow aisles between storage racks. In such cases the second, unused table, may "drift" into such a location that when the crane is moved, the unused table comes into contact with the rack or the materials which are stored in the racks, and which may extend slightly into the aisle, thereby causing substantial physical damage.

SUMMARY OF THE INVENTION

Therefore, the main object of this invention is to provide a clutch and lock mechanism which most efficaciously overcomes the aforesaid drawbacks and deficiencies.

A further object of this invention is to provide such a mechanism adapted for use with double shuttle tables, which synchronizes the movement of the first and second shuttle tables.

It is still another object of this invention to provide such a clutch and lock mechanism which maintains the first and second shuttle tables in alignment.

It is still another object of this invention to provide such a clutch and lock mechanism which prevents the movement of an unused shuttle table.

Generally speaking, the objectives of the present invention are attained by the provision of a clutch and lock mechanism comprising a first shaft rotatable about an axis of rotation, a first shaft ring assembly fixedly coupled to the first shaft, a second shaft rotatable about the axis of rotation, a second shaft ring assembly fixedly coupled to the second shaft, the first and second shafts and the first and second shaft ring assemblies being spaced one from the other, and an engaging mechanism positioned between the first and second shaft ring assemblies and movable therebetween, at least a first portion of the engaging mechanism being rotationally locked to the second shaft and movable into rotationally locking engagement with the first shaft ring assembly for rotationally coupling the first and second shafts.

BRIEF DESCRIPTION OF THE DRAWINGS

The foregoing and other objects and features of the present invention will be more clearly understood from the following detailed description thereof when read in conjunction with the accompanying drawings, in which.

DESCRIPTION OF THE PREFERRED EMBODIMENT

Figure 1:
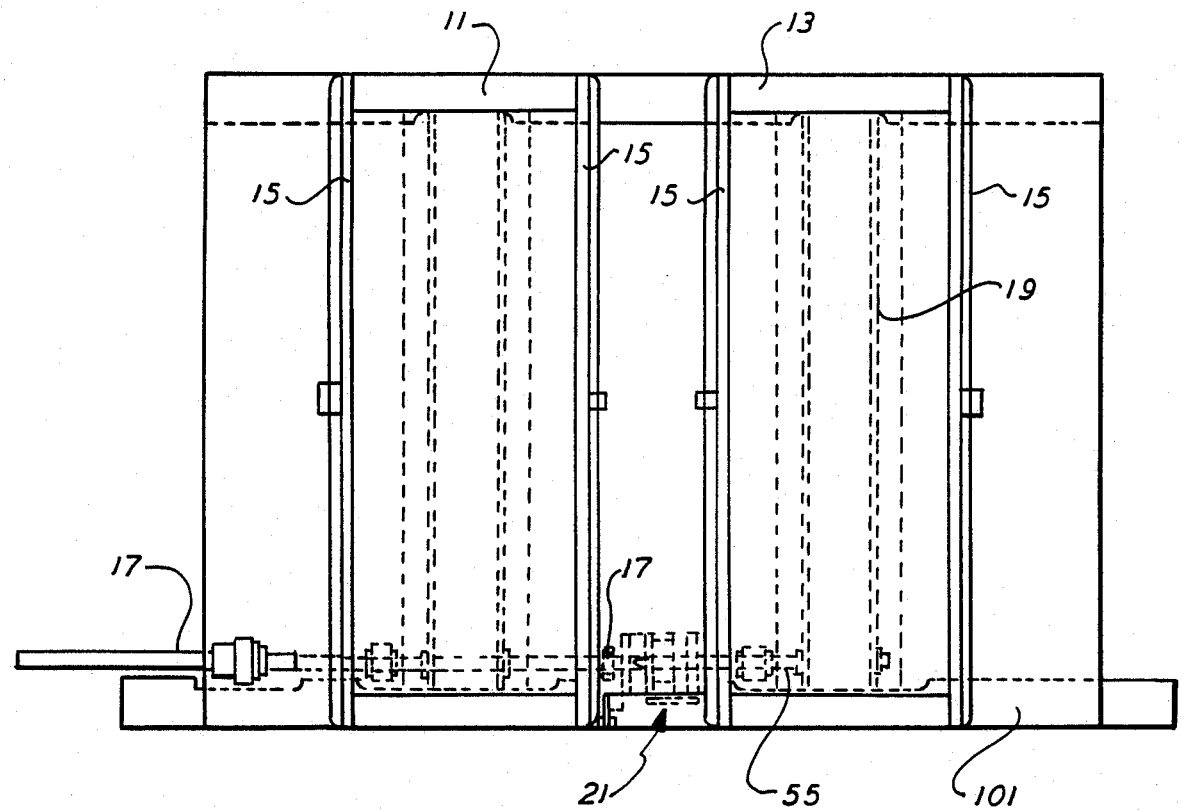
FIG. 1 is a plan view of a double shuttle table incorporating the inventive clutch and lock mechanism.
Figure 2:
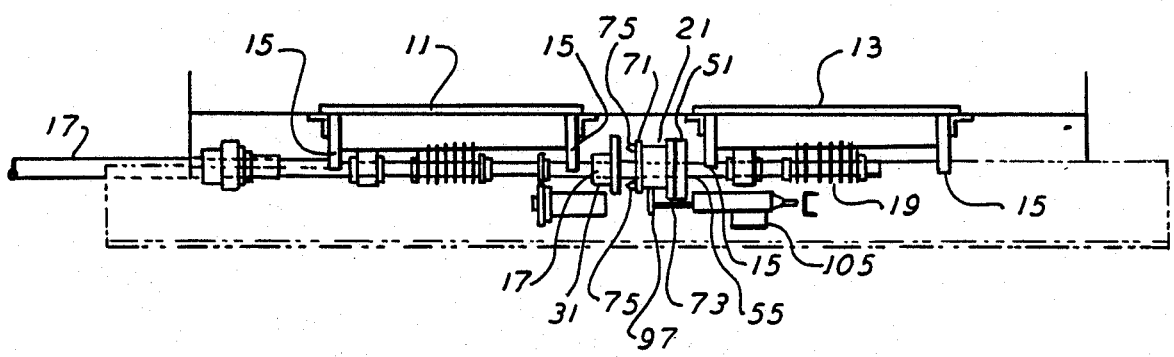
FIG. 2 is an end view of the double shuttle table shown in FIG. 1.

Turning first to FIGS. 1 and 2, a plan view and an end view, respectively, of a double shuttle table device incorporating the inventive clutch and lock mechanism, there are seen first and second shuttle tables, indicated at 11 and 13, respectively. Shuttle table 11 is denominated, for ease of reference, the master table and shuttle table 13 is denominated the slave table. The two tables are mounted, in a conventional manner, on rails, indicated at 15. The tables, which may advantageously be mounted on a crane or elevator in a warehouse, may be driven (directly or indirectly) by a motor (not shown) coupled to a drive shaft 17. Generally, it may be seen that the structure, function and environment of the master table 11 are as shown in U.S. Pat. Nos. 4,458,808 and 4,595,332, both assigned to the assignee of the instant invention.

The slave table 13 (as well as the master table 11), which is, as previously noted, mounted on rails 15, and which may be reciprocally driven in any conventional manner, here a chain drive indicated at 19, may be drivingly coupled, via a clutch and lock mechanism 21, to master table 11 and to drive shaft 17.

Figure 3:
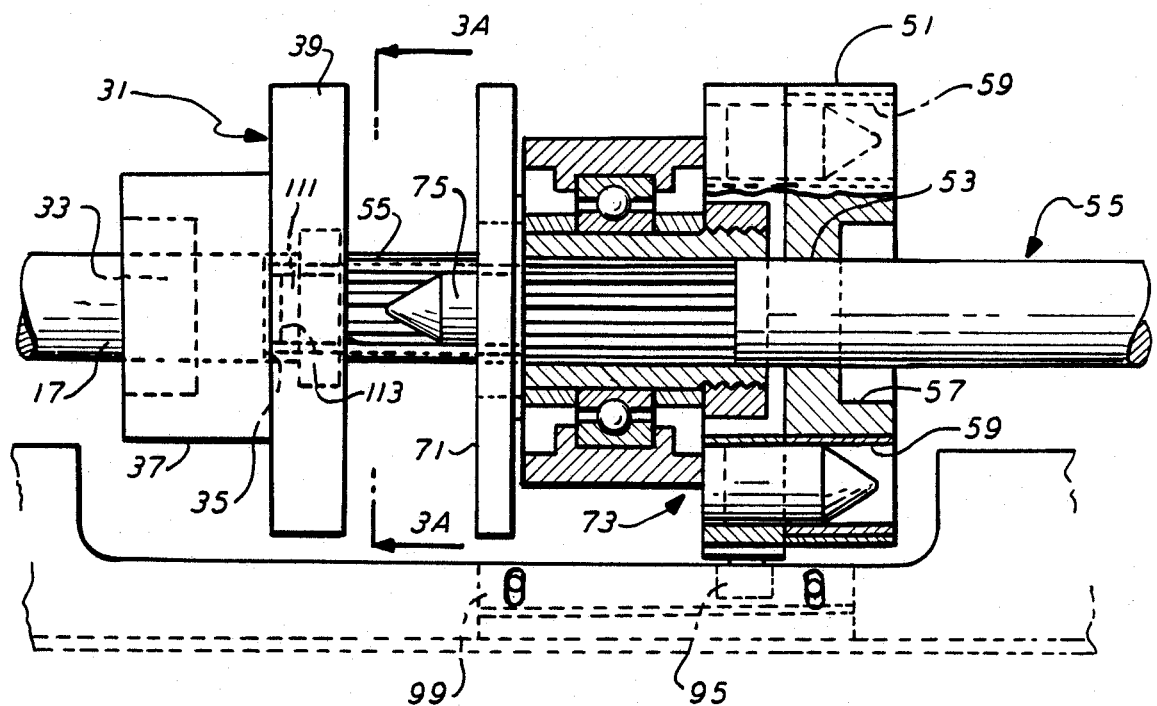
FIG. 3 is a detailed plan view of the instant clutch and lock mechanism.
Figure 3A:
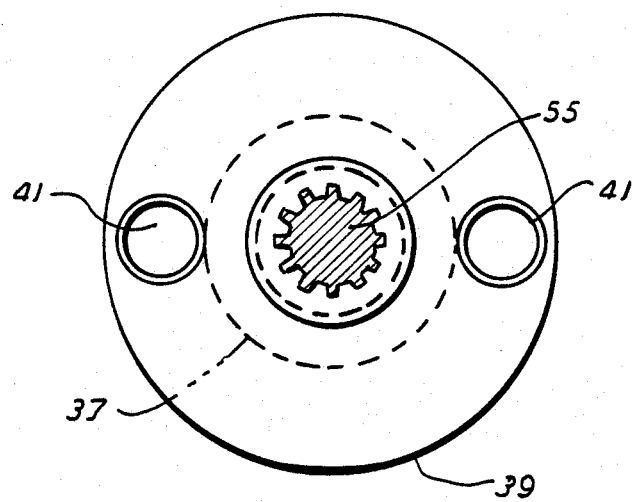
FIG. 3A is a sectional view taken along line 3A of FIG. 3.

Turning now to FIGS. 3 and 3A, the clutch and lock mechanism 21 will be more fully described. A primary shaft ring assembly, indicated at 31 is formed with a centrally located circular aperture 33 therein. The drive shaft 17 extends into said aperture 33 to, for example, a location indicated by dashed lines at 35 where it may be rotationally and laterally locked in any conventional manner, for example, by press-fitting or by utilizing a shaft locking assembly of a conventional type (not illustrated). The shaft ring assembly may conveniently be configured as two concentric cylindrical members, indicated at 37 and 39, respectively the member 39 having the greater diameter, as more clearly illustrated in FIG. 3A. Formed in said member 39 are two receptacles, indicated at 41, here illustrated as having circular cross-sections which may, but need not, extend completely therethrough. The purpose of said receptacles 41 will be explained in greater detail below.

Figure 4:
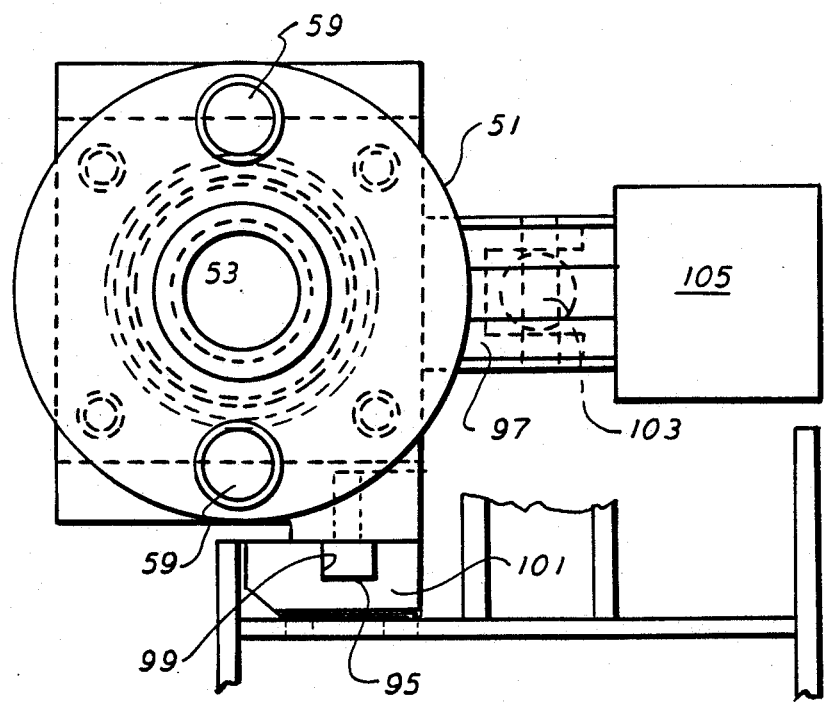
FIG. 4 is a plan view of a portion of the inventive clutch and lock mechanism.

Referring now to FIG. 4 as well as to FIG. 3, a secondary shaft ring assembly, indicated at 51, is illustrated. Assembly 51, which has a circular cross-section, is formed with a shaft receiving, generally circular, aperture 53 therein, which shaft is indicated at 55. The shaft 55 is locked, both rotationally and laterally, relative to the assembly 51, and this locking may be accomplished by means of a press-fit or, for example, by means of a conventional shaft-hub locking device (not shown) inserted into the counter-sunk aperture 57 which may be provided to receive such locking device. The drive shaft 55 is connected, in any conventional manner, to the drive mechanism of the slave shuttle table 13. The shaft ring assembly 51 is formed with two receptacles, indicated at 59, here illustrated as having circular cross-sections, the purpose of which will be more fully explained below.

As will be understood from the foregoing description, the primary shaft ring assembly 31 is fixedly coupled (both rotationally and laterally) to the master shuttle table 11 by means of the drive shaft 17 while secondary shaft ring assembly 51 is fixedly coupled (both rotationally and laterally) to slave shuttle table 13 by means of the shaft 55.

Figure 5A:
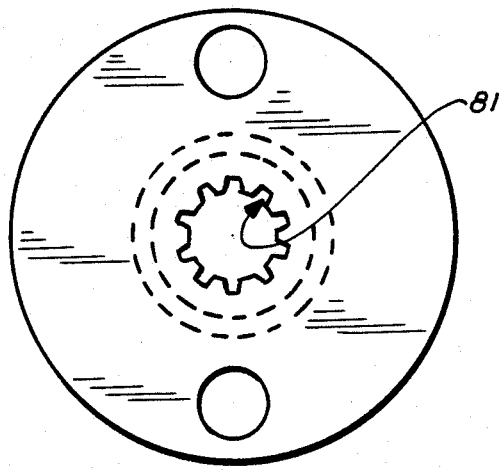
FIGS. 5 and 5A are a plan view and an end view, respectively, of one portion of the inventive clutch and lock mechanism.
Figure 5:
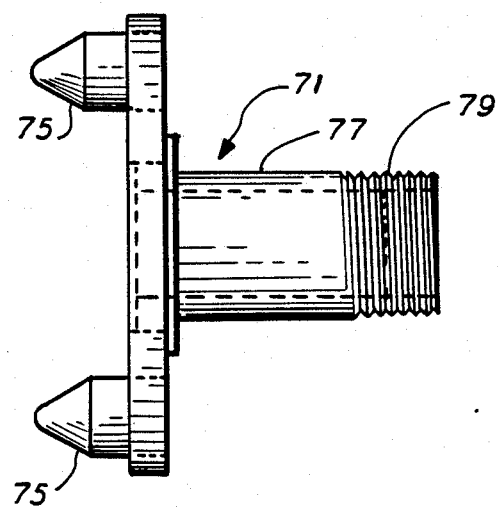

Referring again to FIGS. 3 and 4, the portion of the clutch and lock mechanism 21 which is laterally movable, i.e., the engaging mechanism, will now be described. This portion of the mechanism includes a first portion, the spindle assembly 71 and a second portion, the bearing housing 73. The spindle assembly 71 (most clearly shown in FIGS. 5 and 5A), which has a circular cross-section, includes a pair of conical locking pins, indicated at 75, extending laterally therefrom. Assembly 71 includes an axially (or laterally) extending cylindrical portion 77 which is threaded at the distal end thereof, as indicated at 79. The cylindrical portion 77 is formed with a longitudinally extending aperture therethrough, indicated at 81, which aperture is formed with splines through a substantial portion thereof. It is here appropriate to note that the shaft 55 (to be discussed below) is also splined in at least that portion thereof which extends through the splined portion of the spindle assembly 71 and mates therewith, thereby rotationally (but not laterally) locking shaft 55 to spindle assembly 71.

Figure 6:
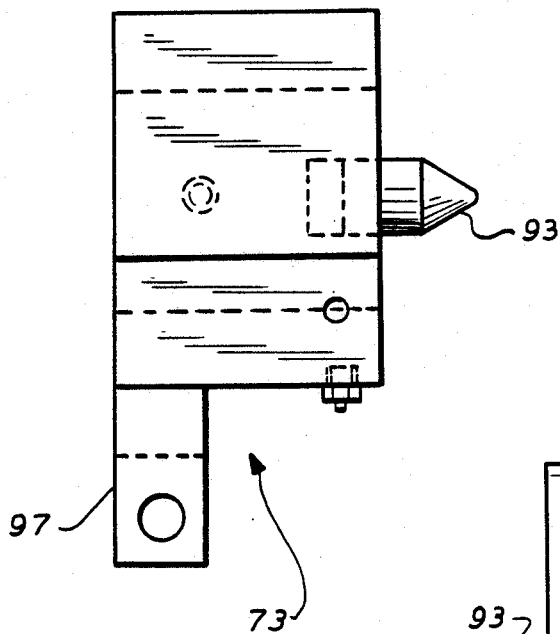
FIGS. 6 and 6A are a plan and an end view, respectively, of a second portion of the inventive clutch and lock mechanism.
Figure 6A:
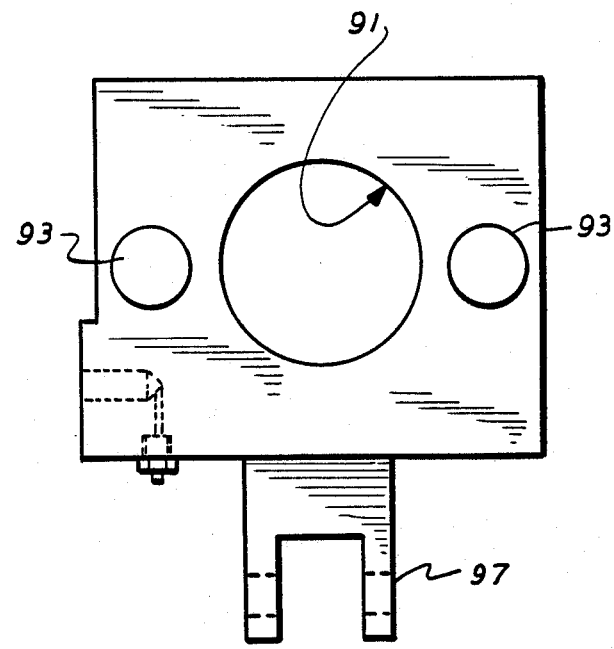

Bearing housing 73 (most clearly shown in FIGS. 6 and 6A) has a generally rectangular cross-section and is formed with a circular aperture, indicated at 91, extending therethrough. A bearing and a threaded, adjustable, lock-nut (not shown), adapted to receive the threaded portion 79 of the spindle assembly 71, are positioned within said aperture 91 and rotationally support the shaft 55. The lock nut and bearing combination also serve to laterally fix spindle assembly 71 relative to bearing housing 73 while permitting assembly 71 to rotate freely relative to housing 73. The housing 73 includes a pair of conical locking pins, indicated at 93, extending laterally therefrom. The housing also includes a cam roller 95 (any conventional anti-rotation guide could be used) mounted thereon (most clearly seen in FIGS. 3 and 4) and a drive collar, indicated at 97.

The cam roller 95 is adapted to be positioned within a laterally extending channel 99 fixed to any convenient part of the shuttle table support frame, here indicated at 101 (FIG. 1), to prevent rotation of the bearing housing 73. The drive collar 97 (FIGS. 6 and 6A) is adapted to receive and be connected to any suitable drive mechanism, here illustrated as a reciprocating shaft 103 which is driven by an electric linear actuator 105, which actuator 105 may be fixedly mounted on any conveniently located portion of the shuttle table support frame 101.

Figure 7:
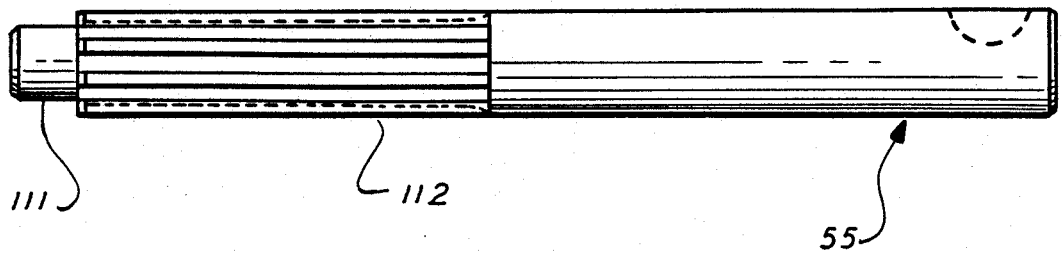
FIG. 7 is a plan view of a shaft adapted to be utilized with the inventive clutch and lock mechanism.

Turning now to the shaft 55, illustrated most clearly in FIG. 7, it maybe seen that the shaft includes a circular cross-section pilot portion, indicated at 111. The pilot portion 111 is adjacent to the previously discussed splined portion of the shaft, which spline portion is indicated at 112. The pilot portion 111, which extends within primary shaft ring assembly 31 to a location indicated at 113 (see FIG. 3), may be utilized to insure alignment.

DESCRIPTION OF OPERATION

Referring primarily to FIGS. 2 and 3, the operation of the inventive clutch and lock mechanism will now be described in greater detail. As previously noted, the function of the mechanism 21 is to insure that, when desired, the master table 11 and the slave table 13 move in tandem, or alternatively, to insure that when desired, the master table 11 moves alone, without slave table movement, the slave table 13 being locked in position. Turning first to the circumstance where it is desired that the tables 11 and 13 move in tandem, the operation of the system is as follows. A signal, provided in any conventional manner, for example, by a mechanical switch, or software, or even manually, is provided to linear actuator 105. This causes shaft or piston 103, which is connected to the drive collar 97, to urge spindle assembly 71 and bearing housing 73 to move in the direction of primary shaft ring assembly 31. This movement of the spindle assembly 71 and bearing housing 73, which is guided in part by the pilot portion 111 of the shaft 55, continues until the conical locking pins or mating member 75 mate with the receptacles 41, which may be seen to be a complementary mating member. As previously noted, the primary shaft ring assembly 31 is locked to the drive shaft 17. Therefore, activation of the drive shaft 17 for the purpose of causing shuttle table 11 to move, also causes rotation of shaft ring assembly 31. This rotation of primary shaft ring assembly 31 results in the rotation of the spindle assembly 71 due to the locking action of the pins 75. Rotation of spindle assembly 71 results, in turn, in the rotation of shaft 55, thereby resulting in the desired movement of the shuttle table 13. It is appropriate to note that, although the pins 75 and the receptacles 41 have been illustrated and described as being parts of spindle assembly 71 and shaft ring assembly member 39, respectively, the locations of the pins 75 and the receptacles 41 could, of course, be reversed without varying the operation of the system.

In the event that it is desired that shuttle table 11 move while shuttle 13 remains stationary, an appropriate signal is provided to linear actuator 105 resulting in the spindle assembly 71 and bearing housing 73 assuming a position spaced from primary shaft ring assembly 31 (as is illustrated in FIG. 3). Activation of the drive shaft 17 will, of course, result in movement of the shuttle table 11 and the rotation of shaft ring assembly 31. In this configuration, however, spindle assembly 71 and the shaft 55 will not be driven. They would, however, absent a locking mechanism, be free to rotate. It is to prevent such rotation, and the resultant movement of the shuttle table 13, due, perhaps, to vibration, that the locking mechanism is provided. In the configuration shown in FIG. 3, that is, the spindle assembly 71 and the bearing housing 73 being spaced from ring assembly 31, the locking pins 93 of the housing 73 mate with the apertures 59 of the shaft ring assembly 51. The bearing assembly 73 is, of course, rotationally locked by the action of cam roller 95 which is positioned within the channel 99. The locking action of the pins 93, in turn, rotationally locks the shaft ring assembly 51, preventing rotation thereof. Inasmuch as ring assembly 51 is, as previously noted, rotationally locked relative to the shaft 55, the shaft 55 is incapable of rotation which, in turn, results in the locking of the shuttle table 13.

It is appropriate to note at this point that although any suitable mechanism can be used for moving the spindle assembly 71 and bearing housing 73, such as, for example, a hydraulic mechanism or a solenoid, it has been found most useful to use an electric linear actuator. This is because this device has the property of maintaining its shaft 103 in position in the event of a loss of power. Many other conventional mechanisms on the other hand, for example, electromagnetic devices such as solenoids, are biased devices which, upon the loss of power, assume their inactivated position which can, in turn, result in a loss of synchronization between the master and slave shuttle tables.

While the principles of the invention have been described in connection with a specific structure, it is to be understood that this description is made only by way of example and not as a limitation to the scope of the invention as set forth in the objects hereof and in the accompanying claims.

I claim:
1. A clutch and lock mechanism comprising:
a first shaft rotatable about an axis of rotation;
a first shaft ring assembly fixedly coupled to said first shaft;
a second shaft rotatable about said axis of rotation;
a second shaft ring assembly fixedly coupled to said second shaft,
said first and second shafts and said first and second shaft ring assemblies being spaced one from the other; and
an engaging mechanism positioned between said first and second shaft ring assemblies and laterally movable along said axis of rotation between said first and second shaft ring assemblies,
said engaging mechanism including first and second portions which are rotatable relative to one another and laterally fixed relative to one another,
wherein one of said second portion of said engaging mechanism or said second shaft ring assembly includes at least one axially extending locking pin and the other of said second portion of said engaging mechanism or said second shaft ring assembly includes at least one receptacle complementary to said locking pin adapted to mate therewith for rotationally locking said second portion of said engaging mechanism to said second shaft ring assembly.
2. A clutch and lock mechanism according to claim 1 wherein said first portion of said engaging mechanism includes at least one mating member and said first shaft ring assembly includes at least one complementary mating member adapted to mate therewith for rotationally locking said first portion of said engaging mechanism and said first shaft ring assembly.
3. A clutch and lock mechanism according to claim 2 wherein said at least one mating member comprises an axially extending locking pin and said at least one complementary mating member is a receptacle.
4. A clutch and lock mechanism according to claim 1 further comprising anti-rotation means coupled to said second portion of said engaging mechanism for preventing rotation of said second shaft when said at least one mating member of said second portion is mated with said at least one complementary mating member of said second shaft ring assembly.
5. A clutch and lock mechanism according to claim 1 wherein said first portion of said engaging mechanism is formed with a splined aperture therein and said second shaft is formed with a splined section which extends into, and mates with, the splined aperture of said first portion.
6. A clutch and lock mechanism comprising:
a first shaft rotatable about an axis of rotation;
a first shaft ring assembly fixedly coupled to said first shaft;
a second shaft rotatable about said axis of rotation;
a second shaft ring assembly fixedly coupled to said second shaft,
second first and second shafts and said first and second shaft ring assemblies being spaced one from the other; and
an engaging mechanism positioned between said first and second shaft ring assemblies and laterally movable along said axis of rotation between said first and second shaft ring assemblies,
said engaging mechanism including first and second portions which are rotatable relative to one another and laterally fixed relative to one another and said second portion of said engaging mechanism is adapted to mate with said second shaft ring assembly for rotationally locking said second portion of said engaging mechanism to said second shaft ring assembly, and
further comprising laterally movable and rotationally fixed cam roller means coupled to said second portion of said engaging mechanism for preventing rotation of said second shaft when said second portion of said engaging mechanism is mated with said second shaft ring assembly.
7. A clutch and lock mechanism according to claim 6 wherein said first portion of said engaging mechanism includes at least one mating member and said first shaft ring assembly includes at least one complementary mating member adapted to mate therewith for rotationally locking said first portion of said engaging mechanism and said first shaft ring assembly.
8. A clutch and lock mechanism according to claim 7 wherein said at least one mating member comprises an axially extending locking pin and said at least one complementary mating member is a receptacle.
9. A clutch and lock mechanism according to claim 6 wherein said first portion of said engaging mechanism is formed with a splined aperture therein and said second shaft is formed with a splined section which extends into, and mates with, the splined aperture of said first portion.

* * * * *